Nov. 8, 1927.  
W. J. COULTAS  
1,648,113  
LEVER SYSTEM FOR POWER DRAWN HARVESTERS.  
Filed Feb. 24, 1921   3 Sheets-Sheet 2
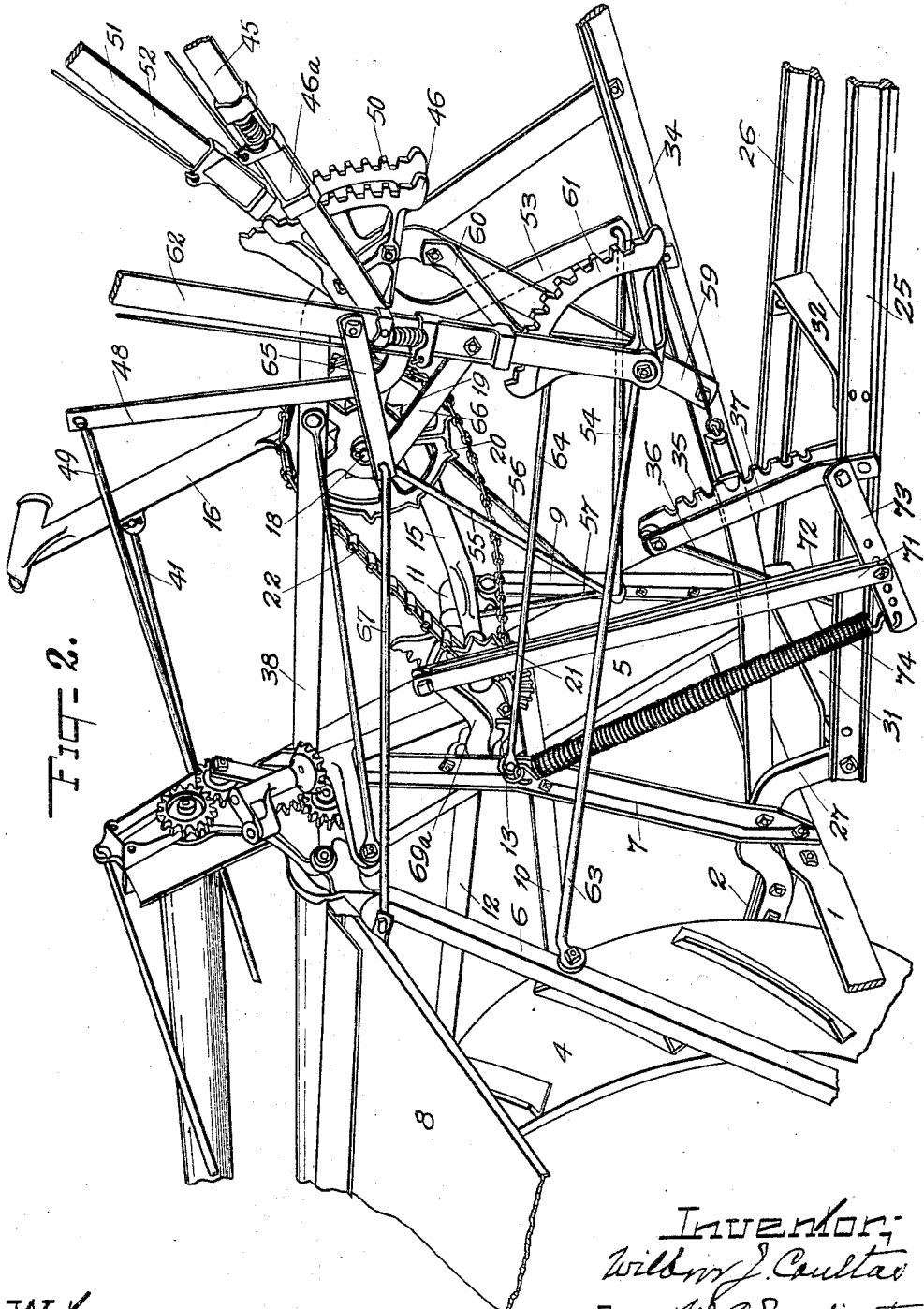

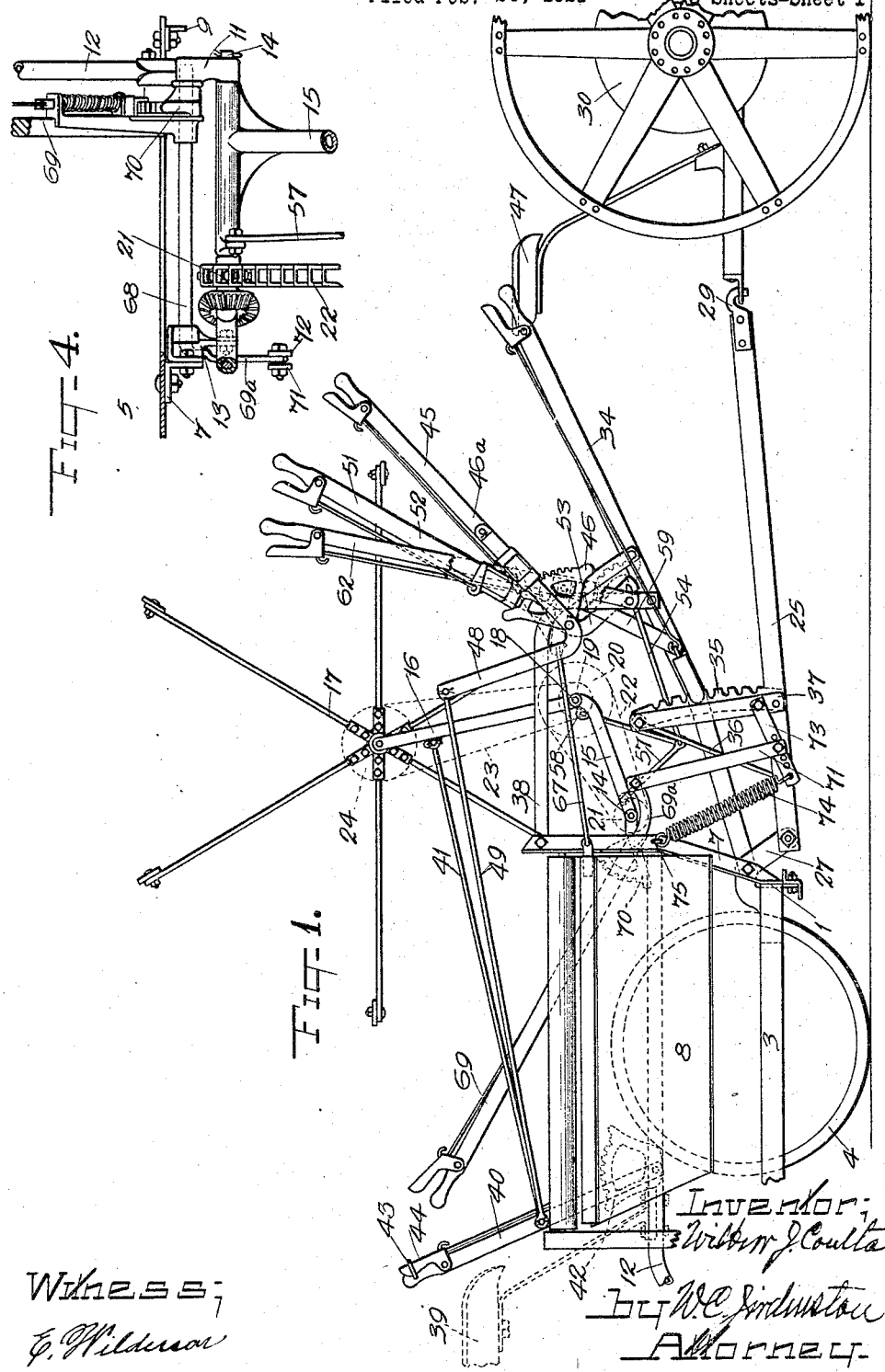

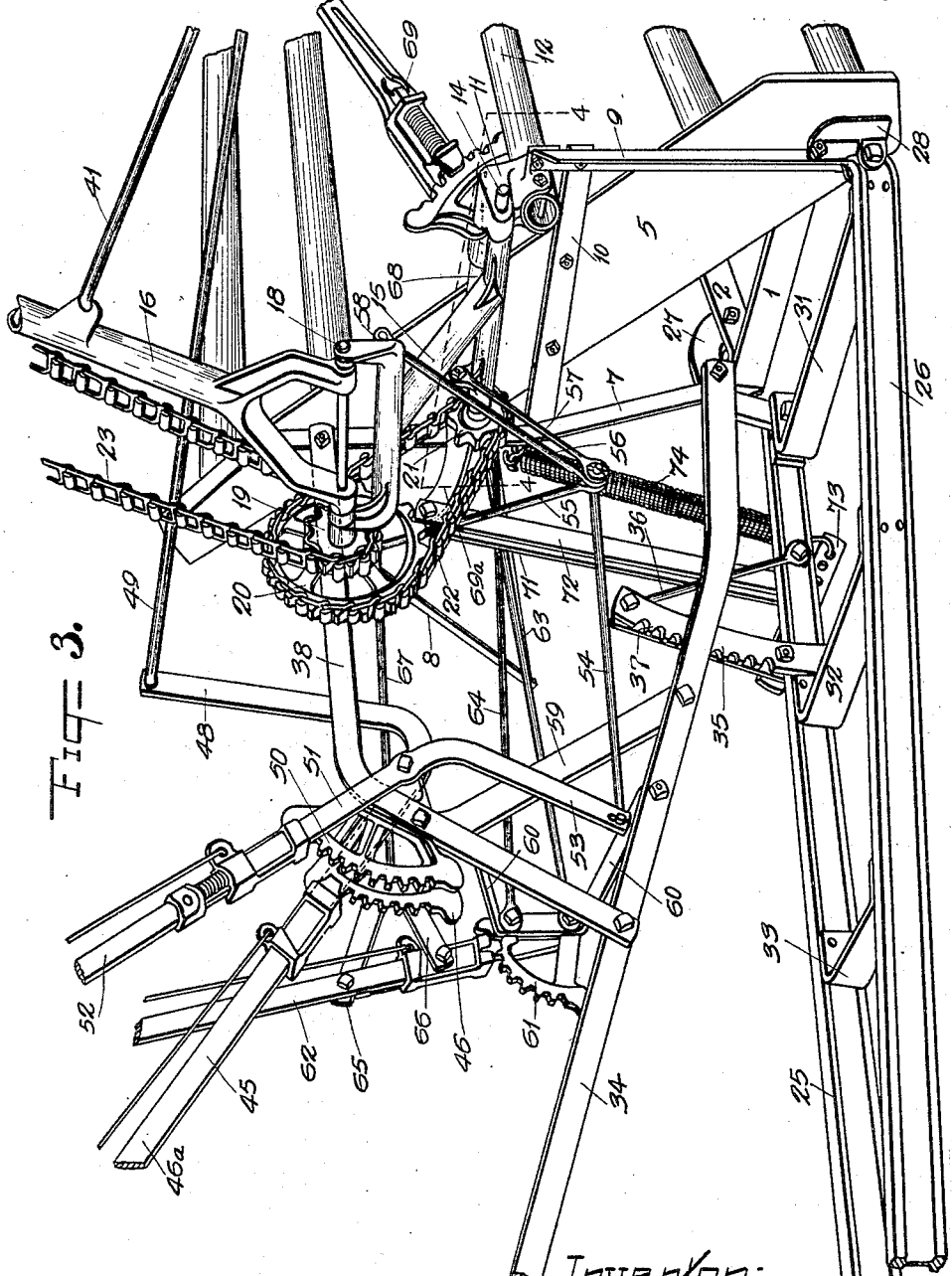

Patented Nov. 8, 1927.

1,648,113

UNITED STATES PATENT OFFICE.

WILBUR J. COULTAS, OF MOLINE, ILLINOIS, ASSIGNOR TO DEERE & COMPANY, OF MOLINE, ILLINOIS, A CORPORATION OF ILLINOIS.

LEVER SYSTEM FOR POWER-DRAWN HARVESTERS.

Application filed February 24, 1921. Serial No. 447,415.

My invention relates to tractor drawn agricultural machinery and more particularly to harvesters, and has for its object the location of the adjusting devices of a harvester in such proximity to an operator of the combined machines as to make the desired adjustments with ease and efficiency.

Referring to the drawings in which similar numerals indicate identical parts—

Figure 1 is a side elevation, taken from the stubbleward side illustrating the application of my improvement, as much of a harvester and tractor being shown as thought necessary.

Figure 2 is an enlarged detail view, in perspective, taken from the stubbleward side, showing the mounting of the various levers.

Figure 3 is a similar view taken from the grainward side, and

Figure 4 is a sectional detail on the line 4—4 of Figure 3.

The part of the harvester and binder shown comprises the front frame bar 1, a transverse frame bar 2, the stubbleward frame bar 3, shown only in Figure 1, the bull-wheel 4, a side 5 of the elevator frame with brace bars 6 and 7, and the binder deck 8; to the lower part of the elevator side 5 is rigidly secured a vertical bar 9 to which is bolted a bar 10 extending stubbleward and bolted to the side 5 and the bar 7. On the upper end of the bar 9 is mounted a casting 11 to which is secured a seat bar 12 of the ordinary type. On the brace bar 7 is bolted a casting 13 having a bearing in alinement with a bearing in the casting 11 in which is secured a shaft 14 having rockably mounted thereon the lower reel standard 15 carrying on its upper end the standard 16 on which the reel 17 is rotatably supported. The standard 16 is rockably supported on a shaft 18 on the upper end of the standard 15, and loosely journaled on the shaft 18 is a sprocket 19 integral with a larger sprocket 20. A sprocket 21 is mounted on the shaft 11 and from the sprocket 21 a chain 22 leads over the sprocket 20, and a similar chain 23 leads over the sprocket 19 to a sprocket 24 on the reel shaft. The reel is operated in a well known manner by power from the bull wheel 4 through a train of gearing mounted on the machine, which together with the parts heretofore enumerated are to be found on modern binders and to which I make no claim.

A draft beam, composed of bars 25 and 26, is pivotally connected to a goose neck 27, rigidly secured to the frame bar 2, and to a casting 28 bolted to the vertical bar 9; the bars 25 and 26 are spaced apart and converge forwardly, and to their forward ends is secured a hook 29 to engage with the rear of tractor 30. To add to the rigidity of the structure of the draft beam I provide braces 31, 32 and 33, which are bolted to the bars 25 and 26 and between them. Pivotally connected to the gooseneck 27 is a forwardly extending lever 34 provided with the usual type of latch to engage with a vertically disposed curved rack bar 35 mounted on the bar 25 of the draft beam and held rigidly in place by braces 36 and 37 which are secured to the upper end of the rack bar 35 and to the bar 25 of the draft beam.

Bolted to the upper end of the brace bar 7 is a forwardly extending bar 38, which is substantially horizontal for part of its length and is then bent downwardly to the lever 34, to which it is secured, forming with the lever 34 a forwardly extending vertically disposed rigid frame mounted on the harvester, and it is readily apparent that by reason of this construction the operation of the lever 34 will tilt the harvester to cut high or low as may be desired. When the reel 17 is controlled from the driver's seat 39, it is by operation of a lever 40 pivotally mounted on the seat bar 12, a rod 41 connecting the lever 40 with the standard 16 and a notched sector 42, secured on the seat bar 12, with which a latch on the lever is adapted to engage according to the adjustment made; when shifting the control of the reel from the harvester to the tractor I disengage the latch on the lever 40 from the sector 42 and hold it disengaged by a loop 43, on the handle of the lever 40, which I slip over the grip 44 of the latch. The reel is then moved forwardly or backwardly by a lever 45 which is pivotally supported intermediate its ends on a notched sector 46, the latter being rigidly secured to the bar 38 at the bend thereof. The lever 45 is bent upwardly in opposite directions from its pivot, the forward part 46ª extending to convenient reach of the seat 47 of the tractor operator and carrying a latch to engage with the notches in the sector 46 whereby the reel can be held in the desired forwardly or rearwardly adjusted position. The rearward part 48 of the lever 45 is connected to the lever 40 by a rod 49, and as the lever 40 is connected to the reel standard 16 by the rod 41 the forwardly or rearwardly adjustment of the reel 17 by operation of the lever 45 is apparent, the lever 40 being free to move, the latch thereof being held out of engagement with the respective sector 42.

Side by side with the sector 46, and secured on the bar 38, is a notched sector 50 with which a lever 51 cooperates, the latter being pivotally supported intermediate its ends on the pivot of the lever 45 and bent to extend divergingly forward from its pivot; the upper part 52 extending to convenient reach from the seat 47, and provided with a latch, as usual, to engage with the notched sector 50. To the lower part 53 of the lever 51 is connected a link 54 which extends to pivotal connection with the apex of an inverted triadic arrangement of rods 55, 56 and 57. The rod 57 is pivotally connected to a projection on the standard 15, adjacent the sprocket 21; a lower horizontal portion of the rod 55 is pivotally connected to the shaft 18 outside of the sprocket 20, and the rod 56 is pivotally connected to an eye 58 on the rear of an upper horizontal portion of the standard 15; by the arrangement of the parts just described the rocking movement of the lever 51 will swing the standards 15 and 16 to raise or lower the reel 17.

In all horizontal binding mechanisms the deck of the binder is laterally adjustable by means on the harvester operated by the driver of the harvester, and for a similar purpose I provide the following described mechanism operatively mounted convenient to the operator of a tractor. Rigidly secured to the bar 38 and the lever 34, on the stubbleward side thereof, is a brace 59 to which is bolted a stubblewardly extending bracket 60 on which is mounted a notched sector 61 also bolted to the lever 34; co-operating with the sector 61 is a lever 62 pivotally supported on the bracket and provided with notches in the sector to hold the lever in any position of adjustment.

A brace 63 is connected to the bracket 60 and to the bar 6, and a similar brace 64 is connected to the bracket 60 and to the bar 7. Secured to the lever 62 above the sector 61 are links 65 and 66 which converge to connection with a rod 67 having its opposite end pivotally connected to the binder deck 8, and as the latter is mounted on the harvester, in a manner well known in the art, for forward or rearward adjustment, it is evident that such adjustment as may be desired is readily effected by operation of the lever 62 which is within convenient reach from the seat 47 on the tractor.

Rotatably journaled in the castings 11 and 13 is a shaft 68 to which is rigidly secured a lever 69 having a latch to engage with a notched sector 70 loosely mounted on the shaft 68 and secured to the seat bar 12 in any suitable manner. The opposite end of the shaft 68 has a forwardly projecting arm 69ª, preferably integral therewith, and to the forward end of which are pivotally connected parallel links 71 and 72 having their lower ends pivotally secured to a bar 73 pivoted on the brace 37 and extending rearwardly. A coiled relief spring 74 has one end engaged with a perforation in the rearward end of the bar 73 and the opposite end hooked in an eye 75 on the brace bar 7. The construction just described is for the purpose of balancing the harvester by operation of the lever 69 to increase or reduce the tension of the spring 74, for if the operator is on the harvester he will rock the lever 69 upwardly and by the link connection of the lever with the bar 73, the latter is swung downwardly, on its pivot on the brace 37, expanding the spring 74 until the harvester is properly balanced, the balance being maintained by the latch on the lever 69 engaging with a notch on the sector 70. If, however, the operator decides to change his position to the tractor, after dismounting from the harvester, he will rock the lever 69 downwardly, consequently the bar 73 will be swung upwardly reducing the tension of the spring 74 to balance the harvester against the loss of the weight of the operator.

From the construction and operation of the parts as shown and described but one man is required to operate the tractor and harvester, the levers for the desired adjustments being convenient to the seat 47.

What I claim is—

1. The combination with a tractor and a harvester, of a draft device connecting the tractor and the harvester, a forwardly extending frame rigidly mounted on the harvester and adjustably connected with the draft device, and a system of adjusting levers pivotally mounted on the frame and connected to the harvester.

2. The combination with a tractor and a harvester, of a draft device pivotally connected to the tractor and the harvester, a forwardly extending frame including a lever rigidly mounted on the harvester and adjustably connected with the draft device and a system of adjusting levers pivotally mounted on the frame and connected to the harvester.

3. The combination with a tractor and a harvester, of a draft device pivotally connected to the tractor and the harvester, a forwardly extending vertically disposed frame rigidly mounted on the harvester and including a lever adjustably connected with the draft device, and a system of adjusting levers pivotally mounted on the frame and connected to the harvester.

4. The combination with a tractor and a harvester, of a draft device pivotally connected to the tractor and the harvester, a forwardly extending frame rigidly mounted on the harvester, a system of adjusting levers pivotally mounted on the frame in fixed position relative to the harvester and connected therewith, and a lever included in said frame and adjustably connected to the draft device and operable to rock the harvester.

5. The combination with a tractor and a harvester, of a draft device pivotally connected to the tractor and the harvester, a forwardly extending frame mounted on the harvester, a reel adjustably supported on the harvester, a reel adjusting lever pivotally supported on said frame, and a lever included in said frame operable to rock the harvester irrespective of the reel adjustment.

6. The combination with a tractor and a harvester, of a draft device pivotally connected to the tractor and the harvester, a forwardly extending frame mounted on the harvester, a reel adjustably supported on the harvester, a reel adjusting lever pivotally supported on said frame, a rack bar on the draft device, and a lever included in said frame operable to rock the harvester irrespective of the reel adjustment and having means to engage with said rack bar.

7. The combination with a tractor and a harvester, of a draft device pivotally connected to the harvester and the tractor, a forwardly extending frame mounted on the harvester, a binder adjusting lever pivotally supported on said frame and operative to adjust the binder of the harvester forwardly and rearwardly, and a lever included in said frame operable to rock the harvester irrespective of the adjustment of said binder.

8. The combination with a tractor and a harvester, of a draft device pivotally connected to the harvester and the tractor, a forwardly extending frame mounted on the harvester, a binder adjusting lever pivotally supported on said frame and operative to adjust the binder of the harvester forwardly and rearwardly, a rack bar on the draft device, and a lever included in said frame operable to rock the harvester irrespective of the adjustment of the binder and having means to engage with said rack bar.

9. The combination with a tractor and a harvester, of a draft device pivotally connected to the tractor and the harvester, a forwardly extending frame mounted on the harvester and adjustably connected with the draft device, a system of adjusting levers pivotally mounted on the frame operable from the tractor and connected to the harvester, and means actuable to operate said levers from the harvester.

10. The combination with a tractor and a harvester, of a draft device pivotally connected to the tractor and the harvester, a forwardly extending frame mounted on the harvester and adjustably connected with the draft device, a system of adjusting levers pivotally mounted on the frame operable from the tractor and connected to the harvester, and levers on the harvester connected with said lever system actuable to operate the latter from the harvester.

11. The combination with a tractor and a harvester, of a draft device pivotally connected to the tractor and to the harvester, a bar pivotally supported on the draft device, a coiled spring connected to said bar and to the harvester, a lever pivotally supported adjacent its forward end on the harvester, and a connection between said bar and lever, whereby actuation of the lever operates to increase or lessen the tension of said spring.

WILBUR J. COULTAS.

CERTIFICATE OF CORRECTION.

Patent No. 1,648,113.                              Granted November 8, 1927, to

WILBUR J. COULTAS.

It is hereby certified that error appears in the printed specification of the above numbered patent requiring correction as follows: Page 2, line 23, after the word "on" insert the words "a lower horizontal portion of the", and in line 24, strike out the words "a lower horizontal position of"; and that the said Letters Patent should be read with these corrections therein that the same may conform to the record of the case in the Patent Office.

Signed and sealed this 6th day of December, A. D. 1927.

Seal.

M. J. Moore
Acting Commissioner of Patents.